Figures 2, 3:
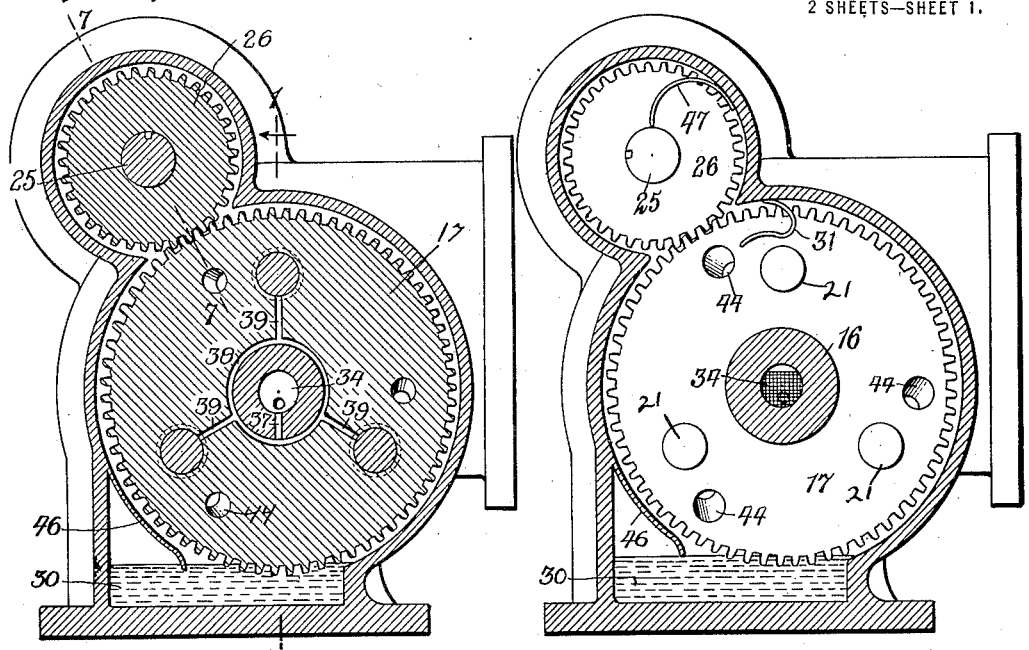

F. REAUGH.
OILING SYSTEM.
APPLICATION FILED AUG. 7, 1918.

1,357,301.

Patented Nov. 2, 1920.
2 SHEETS—SHEET 1.

Inventor
Frank Reaugh
By his Attorney

F. REAUGH.
OILING SYSTEM.
APPLICATION FILED AUG. 7, 1918.
1,357,301.
Patented Nov. 2, 1920.
2 SHEETS—SHEET 2.
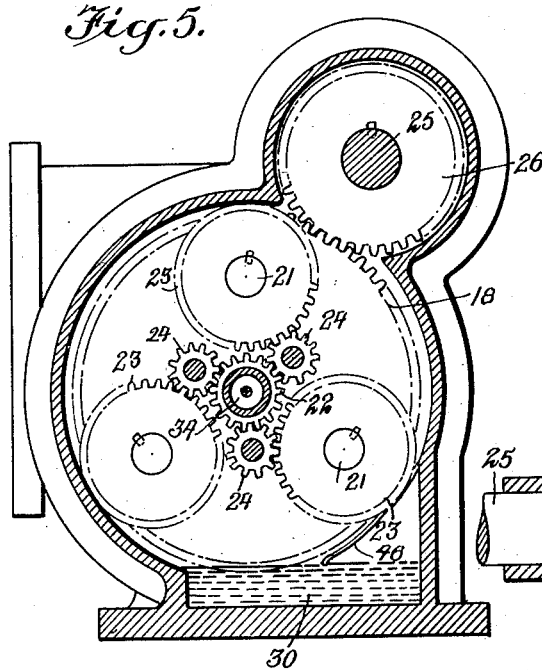
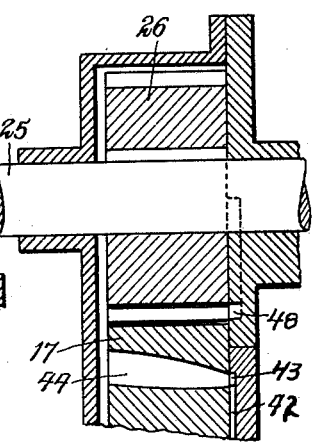
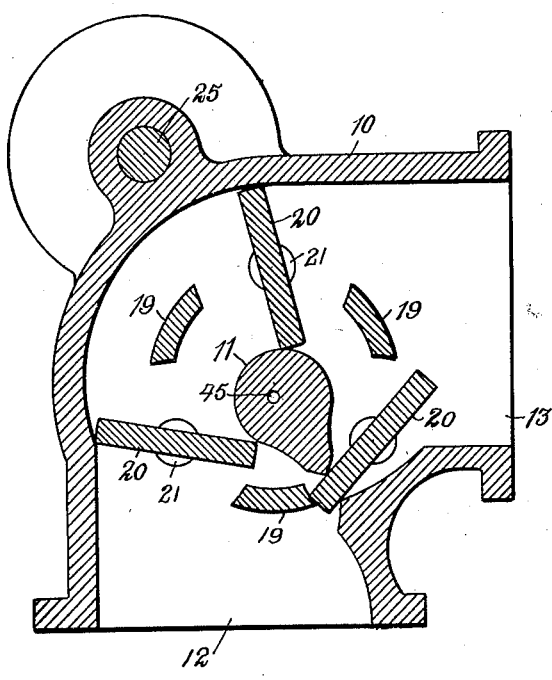
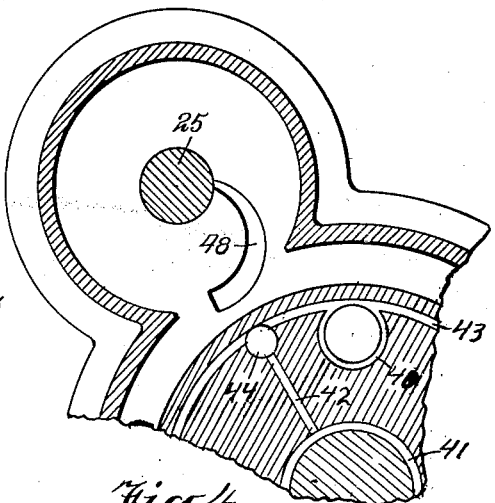
INVENTOR
Frank Reaugh
BY
C. W. Fairbank
his ATTORNEY

UNITED STATES PATENT OFFICE.

FRANK REAUGH, OF OAK CLIFF, TEXAS.

OILING SYSTEM.

1,357,301.   Specification of Letters Patent.   Patented Nov. 2, 1920.

Application filed August 7, 1918. Serial No. 248,666.

*To all whom it may concern:*

Be it known that I, FRANK REAUGH, a citizen of the United States, and a resident of Oak Cliff, in the county of Dallas and State of Texas, have invented certain new and useful Improvements in Oiling Systems, of which the following is a specification.

My invention relates to oiling systems employed for the lubrication of the bearings of rotary parts or members, and depends for its operation upon a novel utilization of the movements of said parts or members for lifting the oil from a main reservoir, distributing it to the surfaces to be lubricated, and permitting its return to the reservoir.

Although my improved system or arrangement of parts is capable of use in or in connection with various different types of machines, it is particularly adapted for use in those machines, mechanisms, or apparatus where a series of bearings for rotatable parts are bodily carried by or formed in a rotor supported on its own independent bearing. Certain features of my invention are capable of use in other types of machines, as for instance, where the bearings of the gear shaft are to be lubricated from a lower level oil reservoir.

As one important feature of my invention I utilize the rotation of the main rotor not only to lift the oil from the main reservoir to a centrally disposed auxiliary reservoir but also to distribute it from the latter to the bearings of the rotatable parts carried by said rotor. As other important features, I utilize the inter-engagement of gear teeth for forcing oil to the bearings of one of the gears above the oil supply, provide improved means for returning the oil after use to the main reservoir, and provide means for straining or purifying the oil while in circuit.

To facilitate the illustrating and clear understanding of my invention I have shown, as an example of a machine in connection with which my invention may be employed, a limacon pump or motor having one embodiment of my invention incorporated therein. Such a limacon pump or motor is shown and broadly claimed in my prior Patent No. 1,101,329 issued June 23, 1914.

Figure 1:
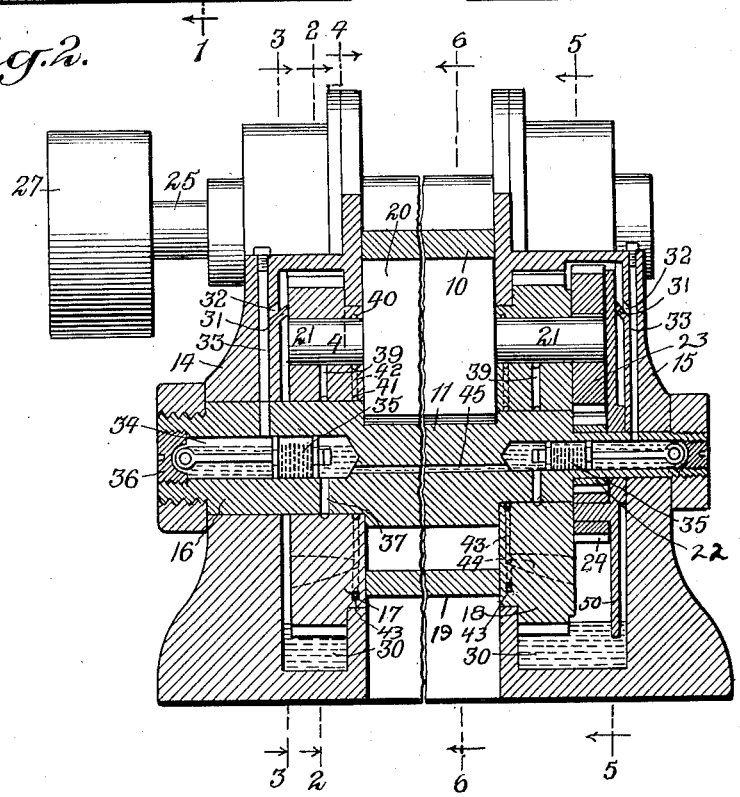

In the drawings:

Figure 1 is a central longitudinal section on the line 1—1 of Fig. 2.

Figs. 2, 3, 4, 5, and 6 are transverse sections on the lines 2—2, 3—3, 4—4, 5—5, and 6—6 respectively of Fig. 1, and Fig. 7 is a sectional detail on the line 7—7 of Fig. 1.

I have illustrated my invention in connection with a pump or motor having a casing 10, the inner peripheral surface of which is curved to approximately conform to a crunodal limacon with a loop, the exterior surface of an eccentrically disposed core corresponding to said loop. In practice, the curvature of these surfaces departs from the true crunodal limacon and its loop only by reason of the necessary thickness of the pistons and the presence of ports 12 and 13 serving for the admission and exit of the fluid passing through the machine and propelling the latter or propelled by it. The core 11 is supported by the end walls 14 and 15 of the casing and as shown is integral with a rigid non-rotatable shaft 16 clamped to the end walls in any suitable manner. Rotatably mounted on this stationary shaft is a main rotor, serving as the piston supporting and carrying frame and including two annular disks 17 and 18 rigidly connected by a plurality of spaced portions 19 of an annular wall concentric with the axis of the shaft 16. Carried by the two disks 17 and 18 are a plurality of pistons 20, each in the form of a blade or paddle mounted to rotate about shafts or trunnions 21 parallel to the axis of the shaft 16 and all spaced at equal distances from the latter and with their axes in the circular plane of the flange 19 midway between successive portions of said flange. The maximum thickness of each piston is substantially equal to the thickness of the flange 19 and substantially equal to the narrowest part of the passage between the core and the peripheral wall of the casing. The width of each blade is substantially equal to the maximum distance between said eccentrically located core and the casing. Some suitable means is employed for rotating the pistons about their axes in the opposite direction to the direction of rotation of the rotor and at one half the speed. As shown, this means includes a gear 22 rigid with the stationary shaft, gears 23 on extensions of the piston shafts or trunnions 21 and intermediate gears 24, each meshing with the central gear 22 and with a corresponding gear 23. By making the gear 23 of twice the pitch diameter of the gear 22 and by mounting the gears 24 on stub shafts projecting from the main rotor, the rotation of the latter will cause the gears 24 to travel around the stationary gear 22 and thereby rotate the gears 23 and the pistons in the opposite direction to the direction of movement of the rotor and at half speed. Thus the pistons will sweep broadside through the wide portion of the passage in the casing between the inlet and outlet and will move edgewise through the narrow portion of the passage. This narrow portion will be closed by the successive portions of the flange or annular wall 19 at such times as the pistons are not filling said narrow portion, as shown in Fig. 6.

To take power from the machine in case it be used as a motor or for transmitting power to it, in case it be employed as a pump or a compressor, the two disks or end members 17 and 18 of the rotor and which carry the pistons and flanges 19 are in the form of gear wheels with peripherally disposed teeth. Mounted in the casing at one side of the passage through the latter is a main power shaft 25 upon which are a pair of similar gears 26 meshing with the two gears 17 and 18. Thus power is transmitted between the shaft 25 and the rotor at both ends of the latter, and torsional strains on the rotor are avoided. The power may be transmitted or taken from the shaft 25 in any suitable manner, as for instance, by a belt pulley 27.

Although the machine above described involves certain novel and important features not shown in my prior Patent No. 1,101,329, the main features of my present invention relate to the oiling system.

The casing at one or both ends thereof has chambers 30 constituting the main reservoir or reservoirs for the lubricating oil. The arrangement of parts for the distribution of the oil may be duplicated at each end of the machine or may be at only one end and transferred through the stationary shaft 16 and core 11. As shown, each reservoir 30 is so positioned that the lower portion of the gear wheel constituting the end of the main rotor continually dips into the oil. The outer surface of the gear wheel 17 is spaced from the end wall 14 of the casing and at the upper part of the casing is a scraper 31 shown particularly in Figs. 1 and 3. This scraper is supported by the wall of the casing and is of such shape that it forms a pocket into which the oil, scraped from the side of the rotor, collects. The walls of the scraper may be slightly inclined as shown in Fig. 1 so as to drain the oil away from the surface of the rotor and opposite the pocket is a downwardly inclined passage 32 leading to a vertical passage 33 radially disposed in the end wall 14. This passage also extends through the stationary shaft 16 to an auxiliary centrally or axially disposed reservoir 34. The rotation of the rotor 17 continually carries up oil on the side of the rotor which is scraped off by the scraper 31 and flows through the passages 32 and 33 to this auxiliary reservoir. Within the latter I preferably mount a strainer or screen 35 through which the oil must pass in escaping from the auxiliary reservoir. The strainer may be connected to a screw-plug or other closure 36 for the outer end of the reservoir so that the strainer may be readily removed and cleaned.

At the opposite side of the strainer from the passage 33 is a downwardly extending passage 37 leading to an annular groove 38 in the bearing surface between the stationary shaft 16 and the rotor member 17. The oil thus drains to this groove by gravity and may work endwise along the bearing surface to lubricate the rotor support. Extending radially from the groove 38 are a plurality of passages 39 extending to the bearings of the piston shafts or trunnions 21. The oil may flow through these passages by gravity when they are below the axis of the machine and may be delivered through them when in any position by the action of centrifugal force. The oil reaching the bearings of the shafts 21 may work endwise along said shafts in both directions. The oil which moves toward the end wall 14 of the casing may emerge on the outer surface of the rotor member 17 and may there drain by gravity back to the main reservoir or may be thrown by centrifugal force out into the path of the scraper 31 for immediate reuse or against the casing wall and thence back by gravity to the main reservoir. The oil which works along the shafts 21 toward the pistons may be collected in annular grooves 40 shown particularly in Fig. 4, and the oil which works along the shaft 16 toward the pistons may be collected in a similar annular groove 41. These grooves are connected by radial passages 42 and an annular passage 43 with passages 44 leading in a general axial direction through the rotor member 17 to the outer surface of the latter. These passages 44 are preferably inclined away from the axis so that centrifugal force will aid in the delivery of the oil therethrough and they are also preferably inclined slightly rearwardly in respect to the direction of rotation of the rotor. The oil emerging from the outer ends of the passages 44 may drain back to the main reservoir or may be thrown out by centrifugal force into the path of the scraper 31 for reuse. The lubricating systems of the two ends of the machine may be entirely independent although they are preferably connected by a passage 45 extending lengthwise through the core 11 and connecting the two auxiliary reservoirs 34—34.

To aid the gear wheel 17 in carrying oil up on its periphery and on the teeth the wall of the casing may closely follow the circle of the outer ends of the teeth down to a point below the oil level in the main reservoir so that the space between the teeth will constitute pockets for carrying up the oil. I have shown the peripheral wall of the casing provided with an extension or flange 46 following the periphery of the gear. This may press very lightly against the teeth so as to more effectively prevent the return of the oil and avoid the necessity of the body of the casing fitting the teeth as accurately as otherwise might be desirable. Some of the oil carried up on the end wall or the periphery of the gear 17 will be transferred to the pinion 26. The end of this pinion is spaced from the end wall of the casing as shown particularly in Fig. 7, and within this space is a scraper 47 shown particularly in Fig. 3. This may be so formed that it removes the oil from the end of the gear and directs it to the shaft 25 to lubricate the outer end of the latter. For lubricating the bearing on the opposite side of the pinion 26, I provide a horn-shaped passage 48 shown particularly in Figs. 4 and 7. This is formed as a groove in the wall of the casing which lies closely adjacent to the surface of the pinion 26 and has its larger end opposite the point where the gear teeth of the gears 17 and 26 come into mesh. The smaller end may terminate on the shaft 25. Thus as the gear teeth come into mesh and squeeze out the oil in the spaces therebetween, some of this oil will be forced laterally into the larger end of the passage 48 and through the latter to the shaft 25.

In Fig. 1, I have shown the parts of the oiling system at the right hand end of the machine somewhat different from those at the left hand end, although they operate on the same principle. This difference is due primarily to the fact that the piston driving gears are at this end. I have shown the main rotor or gear wheel 18 as having a disk 50 spaced therefrom but rigid therewith. In the space between the body of the rotor and the disk are the several gears 22, 23 and 24. The outer surface of the disk serves to carry up the oil to the scraper 31 from which it flows through the passages 32 and 33 to the chamber in the axis. From this chamber, it is distributed the same as at the opposite end of the machine. Within the space containing the gear wheels, I may provide an auxiliary gear, loose on the main central shaft and concentric with the gear 22. This may mesh with the three gears 23 so as to better hold them in step and prevent lost motion.

It will be noted that in my improved system, all of the bearing surfaces for rotatable parts are lubricated from a lower level oil reservoir and that the circulation of the oil is effected solely by the movement of the parts themselves without the addition of any pumping or other oil forcing mechanism. All of the oil after being used may return to the main reservoir and its escape into the main working chamber of the machine is effectively prevented.

Having thus described my invention, what I claim as new and desire to secure by Letters Patent is:

1. A machine having a rotor and a plurality of members carried thereby at spaced points about the axis thereof and rotatable about their individual axes, an oil reservoir concentric with said rotor, and means for feeding oil from said reservoir to the bearings of said members.

2. A machine having a rotor and a plurality of members carried thereby at spaced points about the axis thereof and rotatable about their individual axes, an oil reservoir concentric with said rotor, means for feeding oil from said reservoir to the bearings of said rotor, and means for feeding oil from said last mentioned bearings to the bearings of said member.

3. A machine having a stationary central shaft, a rotor mounted thereon, and members carried by said rotor at spaced points about the axis thereof and rotatable about their individual axes, an oil reservoir concentric with said shaft, means for feeding oil to the bearings of said rotor on said shaft, and means for feeding oil to the bearings of said members in said rotor.

4. A machine having a stationary central shaft, a rotor mounted thereon, and members carried by said rotor at spaced points about the axis thereof and rotatable about their individual axes, an oil reservoir within said shaft, means for feeding oil to the bearings of said rotor on said shaft, and means for feeding oil to the bearings of said members in said rotor.

5. A machine having a stationary central shaft, a rotor mounted thereon and having an annular groove in the bearing surface thereof, a plurality of pistons mounted to rotate in said rotor, an oil reservoir within said central shaft, a conduit for feeding oil from said reservoir to said annular groove and means for feeding oil from said annular groove to the bearings of said pistons.

6. A machine as described in claim 1, having means for delivering oil to one part of said reservoir and a strainer within said reservoir between said delivering means and the feeding means.

7. A machine having a rotor, a plurality of members carried thereby and rotatable about their individual axes, an oil reservoir concentric with said rotor, means for feeding oil by gravity to said reservoir, means for feeding oil by gravity from said reservoir to the bearings of said rotor, and means for feeding oil by centrifugal force from said bearings to the bearings of said members.

8. A machine having a rotor, a plurality of members carried thereby and rotatable about their individual axes, an oil reservoir below said rotor, an auxiliary oil reservoir concentric with said rotor, means operating upon the rotation of said rotor for lifting oil from said main reservoir to said auxiliary reservoir, means for delivering oil from said auxiliary reservoir to the bearings of said rotor and the bearings of said members, and means for returning oil from all of said bearings to said main reservoir.

9. A machine having a central stationary main shaft, provided with an oil reservoir therein, a rotor mounted thereon, pistons mounted in said rotor at spaced points about the axis thereof, means for rotating said pistons about their individual axes during the rotation of said rotor about its axis, an oil reservoir into which said rotor dips as it rotates, means for scraping oil from said rotor and delivering it to said auxiliary reservoir, and means for delivering oil from said auxiliary reservoir to the bearings of said pistons.

10. A machine having a main oil reservoir, a rotor mounted to rotate with its lower edge dipping into the oil in said reservoir, pistons mounted in said rotor to turn therewith and therein, means for wiping oil from the upper peripheral portion of the rotor, and means for conducting the oil wiped from said rotor, to bearings of said pistons.

11. A machine having a main oil reservoir, a rotor mounted to rotate with its lower edge dipping into the oil in said reservoir, pistons mounted in said rotor to turn therewith and therein, an auxiliary reservoir concentric with said rotor, means for wiping oil from the upper portion of said rotor, and conducting it to said reservoir, and means for conducting oil from said reservoir to the bearings of said rotor.

12. A machine having a main oil reservoir, a rotor mounted to rotate with its lower edge dipping into the oil in said reservoir, pistons mounted in said rotor to turn therewith and therein, an auxiliary reservoir concentric with said rotor, means for wiping oil from the upper portion of said rotor, and conducting it to said reservoir, and means for conducting oil from said reservoir to the bearings of said pistons.

13. A machine having a hollow, stationary main shaft, an oil reservoir in the base of the machine, a rotor mounted on said main shaft and having its lower portion extending into said oil reservoir, members mounted to turn on bearings in the rotor, means for scraping oil from the side of the rotor and conducting the same to the hollow in said main shaft, means to feed oil by gravity from said hollow to the bearings of said rotor, means for delivering oil by centrifugal force from said bearings to the bearings of said members, annular grooves in the rotor surrounding the ends of all of said bearings, drain-holes in the periphery of said rotor and disposed at an angle to cause centrifugal force to conduct oil therethrough to the outer side of the rotor and passages connecting said annular grooves with said drain-holes.

14. A machine having a rotor provided with gear teeth, a gear meshing therewith, an oil reservoir into which the lower edge of said rotor extends, means for wiping oil from the upper portion of said rotor, and conduct it to the bearings of said rotor, and means for wiping from the upper portion of said gear the oil transmitted thereto from said rotor, and conducting said oil to the bearings of said gear.

15. A machine having an oil reservoir, a pair of rotatable gear members, one of which is above the oil level and the other of which dips into the oil, a casing inclosing said gear members, and a passage in said casing leading from a point adjacent to the point of intermeshing of the gear teeth and extending upwardly to deliver oil to the bearings in the upper gear member.

16. A machine having a pair of rotatable members with meshing gear teeth, a casing adapted to contain oil and having an end wall thereof fitting the sides of the meshing gear teeth above the oil level, and a passage in said casing extending from a point opposite the point of meshing of the gear teeth to the bearings of one of said members and directly receiving the oil squeezed out from between the teeth as they mesh.

17. A machine having a pair of rotatable members, provided with meshing gear teeth, a casing fitting said members closely adjacent to the point of meshing of the gear teeth and an elongated curved passage for conducting oil from the point of gear meshing to the bearing of one of said members, the curvature of said passage serving to cause the side of the member by its friction to assist in the conveying of the oil against the action of gravity.

18. A machine having a rotor consisting in part of a gear wheel dipping into an oil reservoir, a pinion meshing with said gear wheel, and disposed above the oil reservoir, and a scraper engaging with the side of the pinion adjacent to the point of meshing of the teeth and serving to conduct oil squeezed from between the teeth to the bearings of said pinion.

19. In a machine having a stationary main shaft, a main oil reservoir, a rotor mounted on the main shaft and dipping in the oil in the said oil reservoir, and rotary pistons having bearings in the said rotor, the combination of means to scrape oil from the surface of the rotor and to convey same to the hollow in the main shaft, means to strain the oil in the said hollow, means to feed oil from said hollow to the bearings of the main shaft, and to a groove in the rotor, means to feed oil by centrifugal force to the piston bearings in the rotor, and means to return surplus oil to the main oil reservoir.

20. In a machine having a main shaft, a main oil reservoir, a rotor mounted on the main shaft and dipping into the said oil reservoir, rotating pistons mounted in the rotor, a gear wheel on the rotor and a countershaft carrying a pinion meshing with the gear wheel on the rotor, the combination of means to scrape oil from said gear and pinion and convey the same to the shaft bearings by gravity, means to force oil to the countershaft bearings by the crowding out of the oil from the gear teeth in meshing, means to feed oil to the rotating piston bearings by centrifugal force, and means to return surplus oil to the main oil reservoir by centrifugal action.

Signed at Dallas, in the county of Dallas, and State of Texas, this 19th day of July, A. D. 1918.

FRANK REAUGH.